US010301019B1

(12) United States Patent
Canavor et al.

(10) Patent No.: US 10,301,019 B1
(45) Date of Patent: May 28, 2019

(54) SOURCE LOCATION DETERMINATION

(71) Applicant: Amazon Technologies, Inc., Seattle, WA (US)

(72) Inventors: Darren Ernest Canavor, Redmond, WA (US); Jon Aaron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 14/973,623

(22) Filed: Dec. 17, 2015

(51) Int. Cl.
B64C 39/02 (2006.01)
H04W 4/02 (2018.01)
B64D 47/08 (2006.01)

(52) U.S. Cl.
CPC ........... B64C 39/024 (2013.01); B64D 47/08 (2013.01); H04W 4/02 (2013.01); B64C 2201/128 (2013.01); B64C 2201/146 (2013.01)

(58) Field of Classification Search
CPC ........... B64C 39/024; B64C 2201/146; B64C 2201/128; B64D 47/08; H04W 4/02
USPC .......................................................... 701/3
See application file for complete search history.

(56) References Cited

U.S. PATENT DOCUMENTS

| | | | | |
|---|---|---|---|---|
| 6,792,684 B1* | 9/2004 | Hyyppa | ................. | G01B 11/00 33/1 A |
| 9,174,733 B1* | 11/2015 | Burgess | .................... | B64D 1/12 |
| 9,489,852 B1* | 11/2016 | Chambers | ............. | B64C 39/024 |
| 9,536,216 B1* | 1/2017 | Lisso | ................. | G06Q 10/0832 |
| 9,563,201 B1* | 2/2017 | Tofte | .................... | G05D 1/0038 |
| 9,626,566 B2* | 4/2017 | Versace | ............. | G06K 9/00664 |
| 9,922,405 B2* | 3/2018 | Sauder | .................... | G06T 5/006 |
| 2007/0288132 A1* | 12/2007 | Lam | ..................... | G05D 1/0278 701/23 |
| 2015/0120094 A1* | 4/2015 | Kimchi | ................. | B64C 39/024 701/3 |
| 2015/0266577 A1* | 9/2015 | Jones | ..................... | G05D 1/102 701/3 |
| 2015/0278759 A1* | 10/2015 | Harris | ............. | G06Q 10/08355 705/338 |
| 2016/0039300 A1* | 2/2016 | Wang | .................. | B60L 11/1822 244/39 |
| 2016/0039542 A1* | 2/2016 | Wang | .................. | B60L 11/1809 701/2 |
| 2016/0069743 A1* | 3/2016 | McQuilkin | ........... | G01J 3/2803 356/416 |
| 2016/0078759 A1* | 3/2016 | Nerayoff | ............. | G06Q 20/145 701/3 |
| 2016/0116915 A1* | 4/2016 | Pulleti | .................... | G01S 13/56 701/3 |

(Continued)

FOREIGN PATENT DOCUMENTS

| | | | | |
|---|---|---|---|---|
| CA | 2847766 A1 * | 7/2015 | ............. | G01S 13/90 |
| WO | WO-2012044297 A1 * | 4/2012 | ........... | B64C 39/024 |
| WO | WO-2012175592 A1 * | 12/2012 | ........... | G05D 1/0094 |

Primary Examiner — Tuan C To
(74) Attorney, Agent, or Firm — Athorus, PLLC

(57) ABSTRACT

Described is system and method for determining a location of a client device. In one implementation, an unmanned aerial vehicle (UAV) receives an image of the UAV, obtained by the client device. The image is processed to determine a source area of the client device. As the UAV navigates toward the area, it scans the area for the client device and/or obtains additional information from the client device to aid in determining the location of the client device.

17 Claims, 10 Drawing Sheets

(56) References Cited

U.S. PATENT DOCUMENTS

| | | | |
|---|---|---|---|
| 2016/0117853 A1* | 4/2016 | Zhong | B64C 39/024 |
| | | | 345/634 |
| 2016/0189101 A1* | 6/2016 | Kantor | G08G 5/0013 |
| | | | 705/338 |
| 2016/0253601 A1* | 9/2016 | Akpala | G06Q 30/0623 |
| | | | 705/5 |
| 2016/0356574 A1* | 12/2016 | Tebay | F41G 3/22 |
| 2017/0011343 A1* | 1/2017 | Stenneth | B25J 9/163 |
| 2017/0061227 A1* | 3/2017 | Sharma | G06K 9/3241 |
| 2017/0084037 A1* | 3/2017 | Barajas Hernandez | |
| | | | G06T 7/0044 |
| 2017/0090271 A1* | 3/2017 | Harris | G03B 15/006 |
| 2017/0124883 A1* | 5/2017 | Modica | G05D 1/0676 |
| 2017/0146990 A1* | 5/2017 | Wang | G05D 1/0011 |

\* cited by examiner

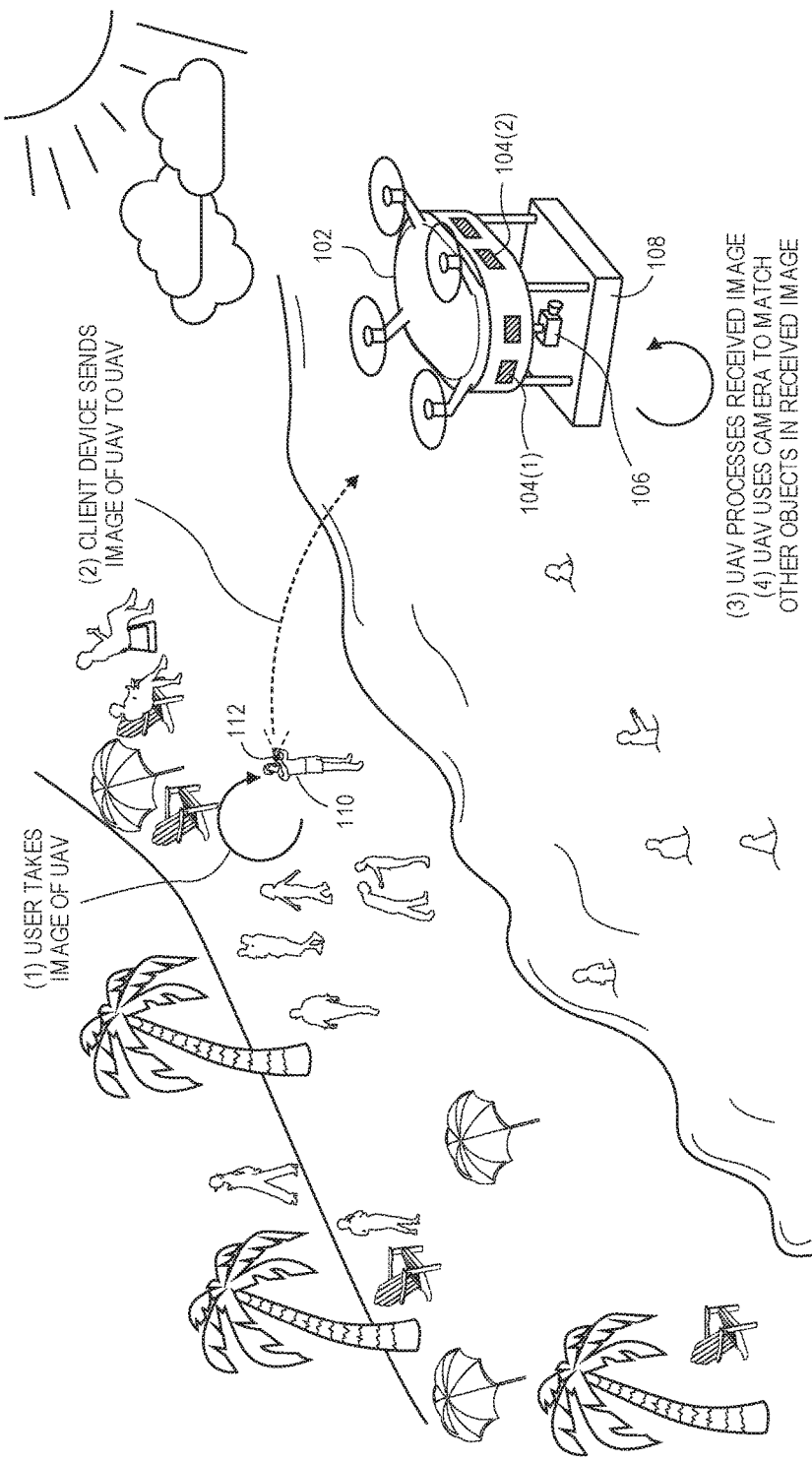

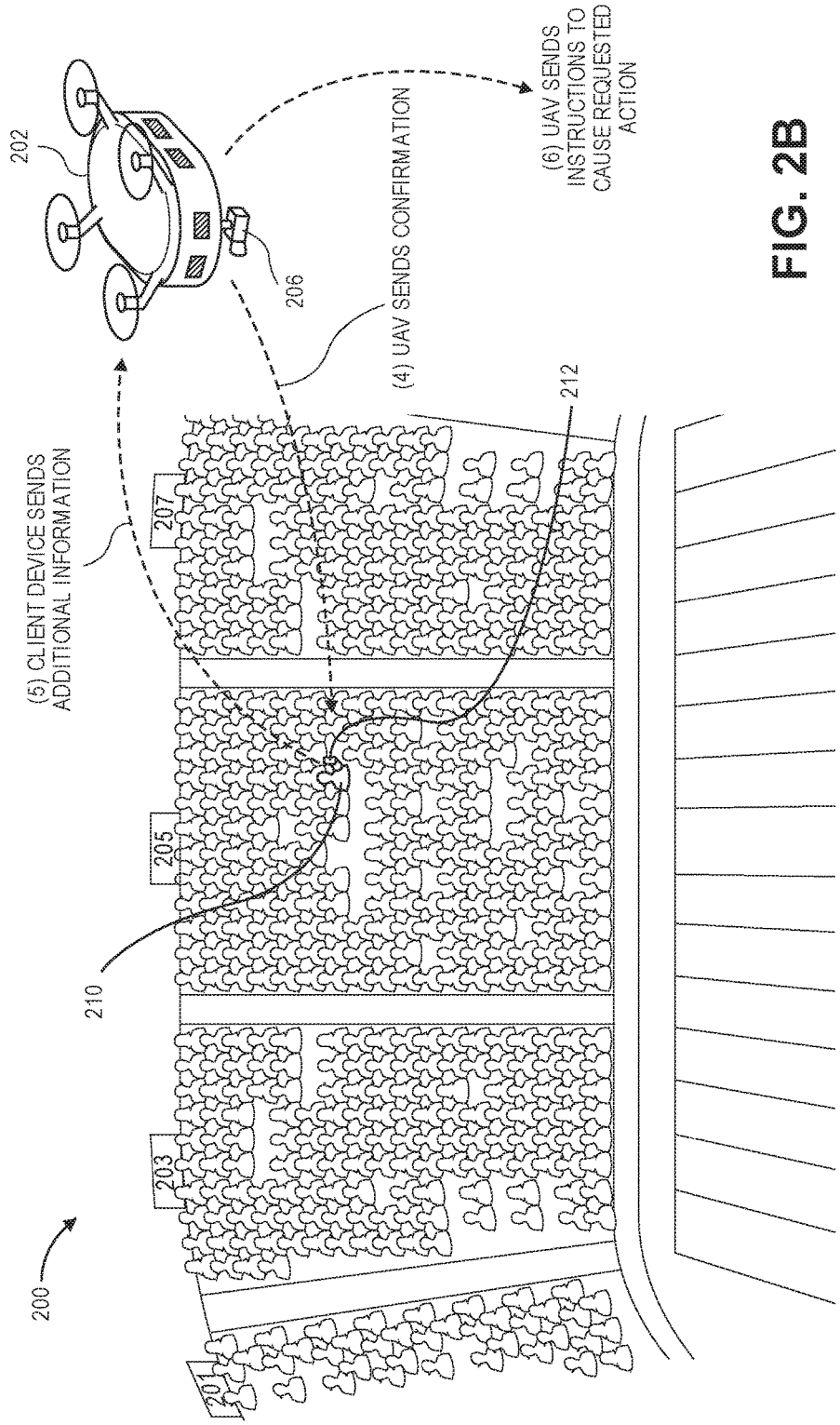

US 10,301,019 B1

SOURCE LOCATION DETERMINATION

BACKGROUND

Humans tend to gather in areas or groups to experience activities, events, social gatherings, etc. For example, humans often gather in stadiums to watch organized sporting events, such as American football, baseball, etc. Likewise, humans often gather on beaches, in parks, at campsites, and/or other areas to spend time together and enjoy the environment. Such gatherings often present difficulties in delivering items to a user at a location within the gathering. Likewise, because some of these gathering locations, such as beaches, campsites, etc. are often in remote areas, wireless network connectivity (e.g., cellular, Wi-Fi) may be limited or non-existent.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 1A-1C depict an uncontrolled environment in which a source location of a client device is determined, according to an implementation.

FIGS. 2A-2B depict a controlled environment in which a source location of a client device is determined, according to an implementation.

Figure 1B:
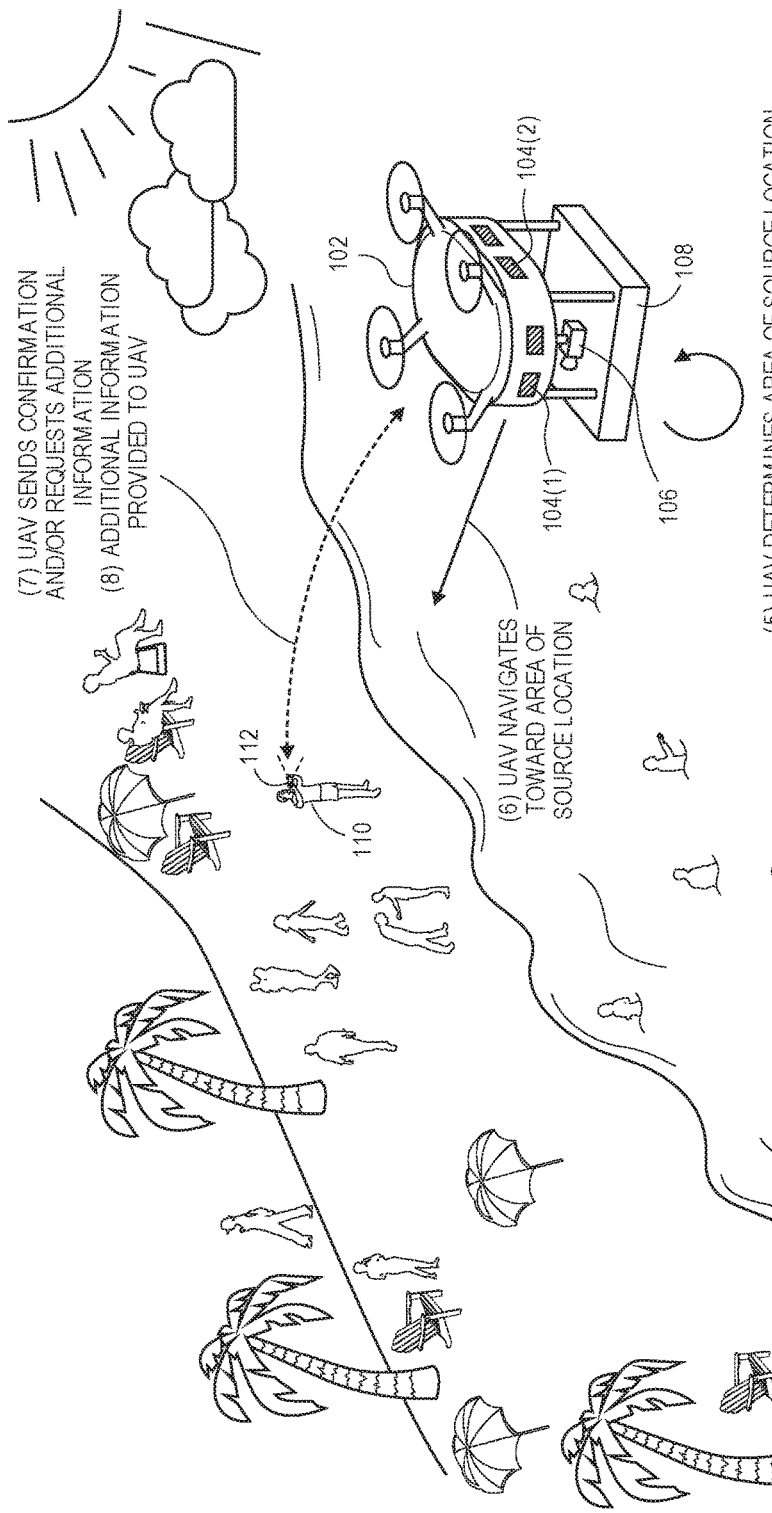

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes method, systems, and apparatus for determining a source location of a client device. In some implementations, an unmanned aerial vehicle ("UAV") may be positioned within an environment and configured to determine a source location of a client device. For example, a user of a client device may utilize a camera on the client device to obtain an image that includes a representation of the UAV. That image may then be sent to the UAV by the client device and the UAV may process the image to determine the perspective of the client device. Based on the perspective of the client device, an area that contains the source location of the client device can be determined and/or the source location can be determined.

For example, the UAV may process the image to determine a side or sides of the UAV that are visible in the image, thereby indicating a perspective of the client device. Alternatively, or in addition thereto, the image may be processed by the UAV to detect other objects represented in the image, such as clouds, buildings, landscapes, other UAVs, other aerial vehicles, etc. In such an example, the UAV may also use one or more cameras coupled to the UAV to scan the environment and detect the additional objects represented in the image. Based on the position of the represented objects and/or the UAV, an area that contains the source location of the client device can be determined.

In some implementations, the environment in which the client device is located may include facility information, such as sections, areas, seating (e.g., within a stadium) that may be used to aid in determining the source location of the client device. Environments in which additional facility information is available are referred to herein as a "controlled environment." Environments in which additional facility information is not available, such as parks, beaches, campgrounds, etc., are referred to herein as an "uncontrolled environment."

While the examples discussed herein refer to a single UAV positioned within an environment, it will be appreciated that multiple UAVs, other types of aerial vehicles, ground based vehicles, and/or water-based vehicles may be used alone or in combination to determine source locations of client devices within an environment.

The implementations discussed herein may be utilized in both indoor environments, such as within buildings, stores, homes, stadiums, materials handling facilities, and/or outdoor environments, such as parks, streets, amphitheaters, beaches, campgrounds, etc. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

Figure 1C:
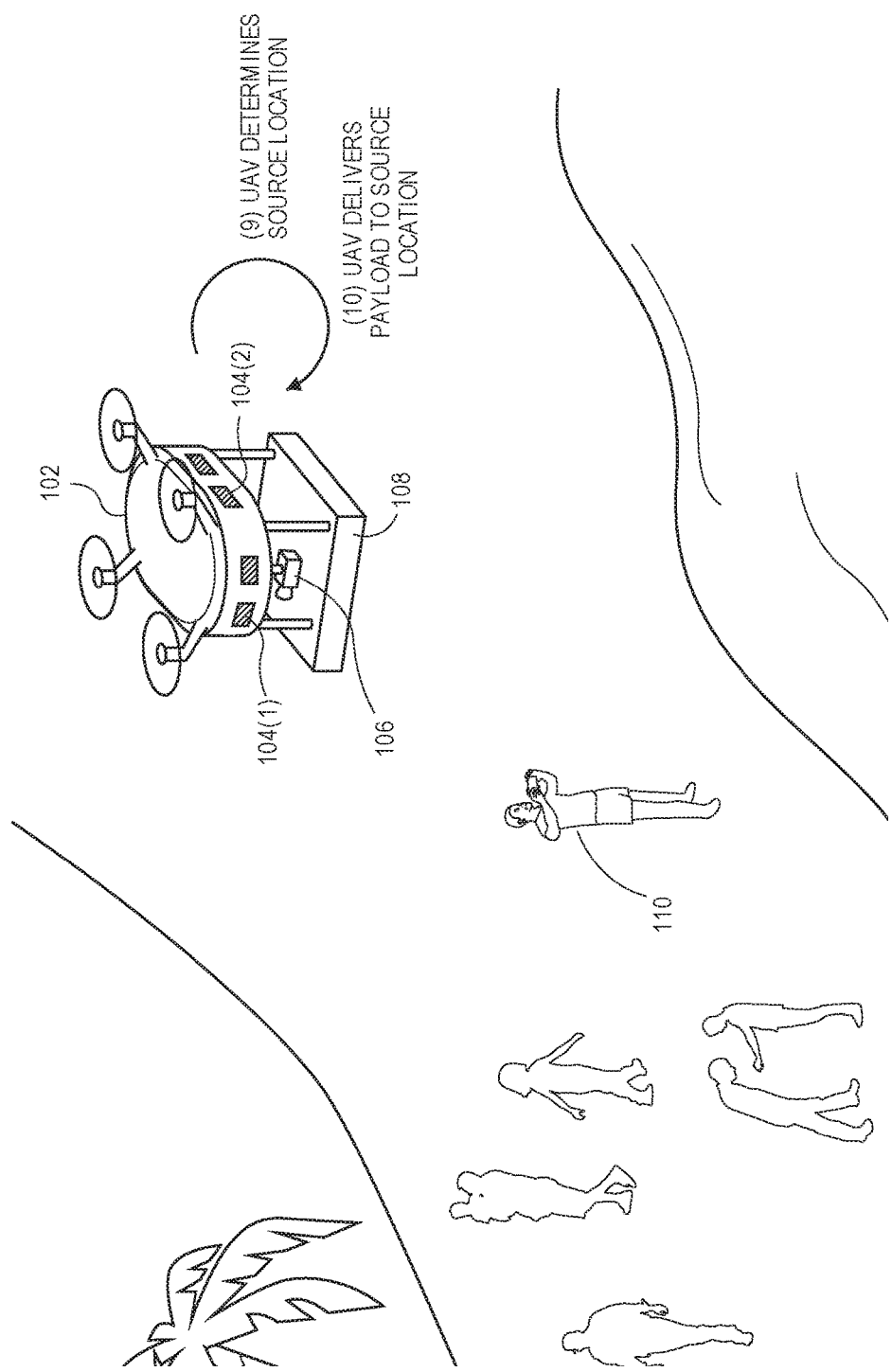
Figure 3:
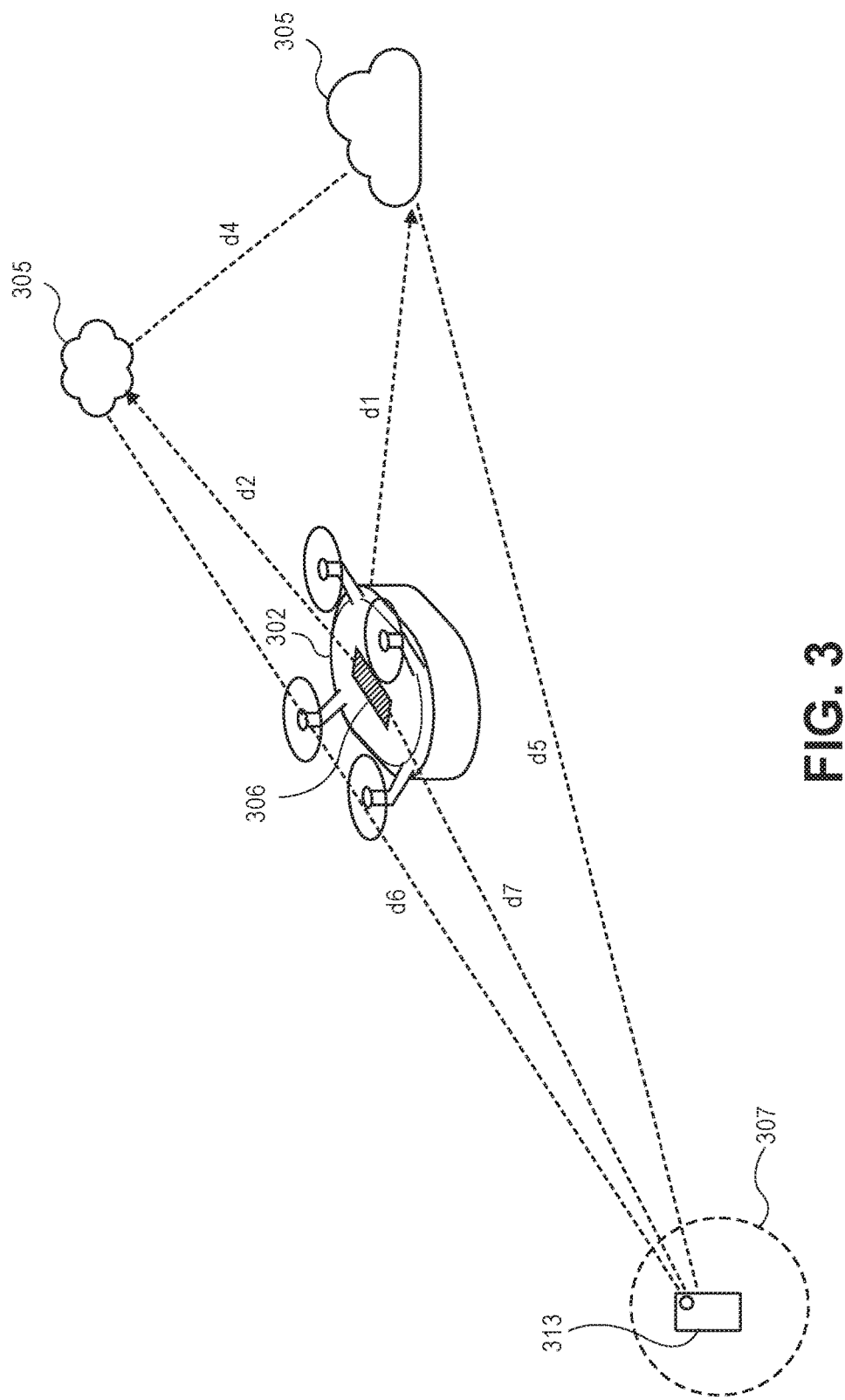
FIG. 3 is a block diagram for determining a source location, according to an implementation.

FIGS. 1A-1C illustrate an uncontrolled environment 100 in which a source location of a client device is determined, according to an implementation. In this example, the uncontrolled environment 100 is a beach. The UAV 102 is positioned aerially within the environment and within view of individuals within the environment. The UAV 102 may be any type of vehicle that can aerially navigate within the uncontrolled environment 102. For example, the UAV 102 may be a quad-copter, octo-copter, a blimp, a helicopter, etc. An example UAV is discussed further below with respect to FIG. 3.

In this example, the UAV 102 includes a plurality of unique identifiers 104 that are positioned on different portions of the exterior of the UAV 102. Different unique identifiers and/or configurations of unique identifiers may be present on different sides of the UAV 102. For example, the unique identifiers 104(1) positioned on a first side of the UAV 102 may be different than the unique identifiers 104(2) positioned on a second side of the UAV 102. As discussed further below, by positioning different unique identifiers on different portions or sides of the UAV 102, when an image of the UAV is obtained, it can be processed and the unique identifiers 104 represented in the image can be used to determine a perspective or view of the client device that obtained the image of the UAV 102.

In some implementations, the UAV 102 also includes an image capture device 106, such as a camera. The image capture device 106 may be positioned anywhere on the UAV, may be mounted on a gimbal so that the image capture device 106 can be positioned independent of the UAV 102 and, in some implementations, there may be multiple image capture devices on the UAV 102.

The UAV 102 may also include a payload 108 or payload dispenser that is configured to dispense one or more items of a payload while the UAV is airborne. For example, the payload 108 dispenser may contain multiple individual packets of an item (e.g., sunscreen, snacks, and games) that can be individually dispensed from the payload 108.

In some implantations, the UAV 102 may also include a display component (not shown), such as a monitor, projector, etc., that presents advertisements or communication information. For example, the display component may present information identifying items that may dispensed by the UAV, and/or a code or number that if entered into a client device will establish a wireless connection with the UAV. In one implementation, the display component may present a message, such as "Text 1234 to have item A delivered to your location."

In other implementations, if an individual within the uncontrolled environment 100, such as user 110, desires to have an item from the UAV 102 delivered, the user 110 may utilize a client device 112, such as a cellular telephone, laptop, tablet, etc., to obtain an image of the UAV 102.

The image of the UAV 102 is then sent by the client device 112 to the UAV 102. In some implementations, the image may be sent using traditional wireless channels, such as Wi-Fi, cellular, satellite, etc. In other implementations, for example, if cellular connectivity is not available, the UAV 102 may be configured to provide a wireless network or point-to-point connection that may be utilized by client devices 112 to wirelessly connected and communicate with the UAV 102. In still other examples, rather than sending the image of the UAV to the UAV, the image of the UAV may be sent by the client device 112 to a remote computing resource (not shown) that is in communication with the UAV 102.

The UAV 102, or remote computing resource, upon receiving an image from the client device, such image including a representation of the UAV taken from the perspective of the client device 112, processes the received image to determine an area within the uncontrolled environment 100 that includes the location of the client device that obtained and sent the image, referred to herein generally as a source location. For example, the UAV 102 may process the image to determine which of the unique identifiers 104 are present in the image, thereby providing a rough perspective of where the source location of the client device is with respect to the UAV 102. In a similar manner, a remote computing resource in communication with the UAV 102 may process the image to determine which of the unique identifiers 104 are present in the image and also determine position information of the UAV 102 (e.g., longitude, latitude, orientation, angle, or altitude). Based on the determined unique identifiers and the UAV position information, the remote computing resource can determine a rough perspective of where the source location of the client device is with respect to the UAV.

In another example, the image from the client device 112 may be processed to determine other objects represented in the image, such as clouds, buildings, trees, other UAVs, landscapes, etc. The UAV 102 may also visually scan the environment to detect the other objects represented in the image. Upon detecting the other objects, the UAV positions the image capture device 106 of the UAV and adjusts the focal length such that the objects viewed by the image capture device 106 are correlated with the representation of the objects in the image received from the client device 112. In a similar manner, the images from the client device and the image obtained by the UAV may be sent to remote computing resources and the remote computing resources may send instructions to the UAV 102 causing the UAV to adjust the angle or position of the image capture device 106 until the images from the UAV 102 correspond with the view represented in the images received from the client device 112.

Turning now to FIG. 1B, based on a known position of the UAV 102 and the determined position of the image capture device 106 of the UAV 102, the source location is determined. For example, referring to FIG. 3, when the objects 305 are correlated between the image received from the client device and the view of the image capture device 306 of the UAV 302, the source location of the client device 312 will be approximately 180 degrees from the orientation of the image capture device 306. Likewise, based on the known position of the UAV 302, the focal length of the image capture device 306 and/or through use of a distance-determining element of the UAV 302, the distances $d_1$ and $d_2$ between the UAV 302 and the objects 305 can be determined. Likewise, the distance $d_4$ between the objects, if there is more than one object represented in the image, can be determined. Finally, the distances $d_5$, $d_6$, $d_7$ can be computed based on the known position of the UAV 302 and the determined positions of the objects 305, and the approximate source location of the client device 312 can be determined. Based on the approximate source location of the client device 312, an area 307 is defined such that it will include the source location of the client device 312. The area 307 may be any defined shape and or size that encompasses the determined approximate source location. For example, the area 307 may include an area having a five-foot radius around the approximate source location. In other examples, the size and/or shape of the area may be different.

Returning to FIG. 1B, upon determining the area 107 of the source location, the UAV begins navigating toward the area of the source location 107. The UAV may also send a confirmation to the client device 112 and/or request additional information from the client device 112. The additional information may include, for example, a visual beacon that is emitted by the client device, an audible beacon that is emitted by the client device, streaming video that includes representations of the UAV, additional images of the UAV, images of the user of the client device, images of a shadow of a user of the client device, etc. In other examples, the UAV 102 may utilize the image capture device 106 to obtain an image of the area 107 that includes the source location of the client device and send that image to the client device with a request for an action from the user 110. For example, the request may ask that the user indicate their position within the image (e.g., by circling themselves in the image, touching the relevant portion of the image). The position information corresponding to the portion of the image may be wirelessly sent back to the UAV as the additional information. In still another example, the UAV may send a request to the client device 112 that the user 110 perform an action, such as standing up, performing a gesture (e.g., raising one arm, waiving). As the user is performing the action, the UAV may use the image capture device 106 to obtain images of the area 107 and process those images to detect the user 110 performing the action.

In still another example, the client device may project an image onto a surface near the area of the client device 112 and send a request to the client device 112 that the user stand on or near the projected image.

In some implementations, the additional information may also indicate an item to be delivered to the source location or another action or service that is to be performed at the source location.

Turning to FIG. 1C, based on the determined area around the client device 112 and the additional information obtained by the UAV, the UAV 102 determines the source location and navigates to a position above the source location of the client device 112. In a similar manner, the additional information may be sent to a remote computing resource and the remote computing resource may determine the location of the client device and send instructions to the UAV 102 that cause the UAV 102 to navigate to a position above the source location.

When positioned above the source location, the UAV 102 delivers a requested item from the payload 108 so that it can be retrieved by the user 110. In some implementations, the UAV may position itself at an altitude above the source location that is high enough so as not to potentially contact any humans but low enough such that a requested item can be dispensed from the payload 108 and allowed to fall to the surface due to gravity without being damaged and/or damaging anyone or thing at the source location. In other examples, the item may be lowered from the UAV. In still other examples, the item may be dispensed from the payload 108 and utilize a parachute to slow the descent of the item to the source location.

In some implementations, the requested item may not be dispensed from the UAV. For example, the UAV may provide an identification of the source location to an agent within the uncontrolled environment 100, and the agent may deliver a requested item to the source location, and/or perform a service at the source location.

While the above examples describe the use of images to determine a source location, in other implementations, audio may be used alone or in combination with images to determine a source location. For example, the client device may send a request in the form of audio that is received by two or more UAVs positioned at known locations within the environment. Based on a time difference of arrival (TDOA) between when the two UAVs received the audio, and based on the known position of the UAVs, the source location of the client device that emitted the audio can be determined.

Figure 2A:
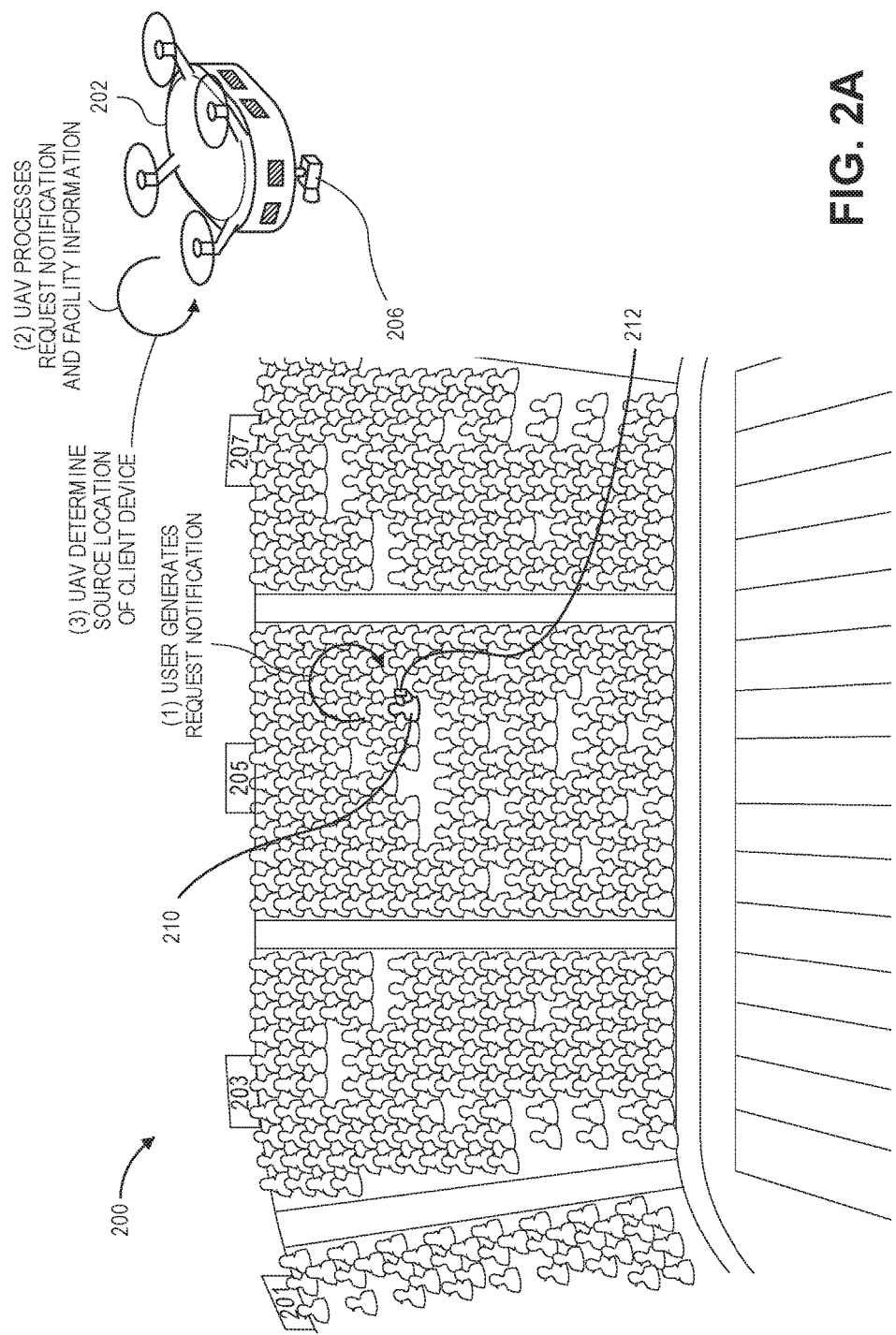

FIGS. 2A-2B illustrate an example of a controlled environment 200 in which a source location is determined, according to an implementation. In this example, the controlled environment 200 is a sports stadium and the facility information regarding the environment includes section, row, and seat numbers for the potential source locations within the controlled environment. In other examples, controlled environments may have additional or less facility information regarding the controlled environment. For example, the controlled environment may be an amphitheater that has general or lawn seating in different sections of the amphitheater. In such an example, the facility information may only include section information of the different areas, but not row or seating information.

In a controlled environment, a user 210 may generate with a client device 212 a request notification that is detected by the UAV 202 positioned within the controlled environment 200. The request notification may be any form of wireless communication with the UAV 202. For example, the request notification may be a visual beacon, audible beacon, or a radio frequency communication that is transmitted to the UAV. The radio frequency may include information about a requested action/item, position information, etc.

The UAV 202, utilizing the image capture device 206 and/or a wireless communication component (not show), detects request notification generated by the client device 212. The image obtained by the image capture device may be processed to determine an area that includes the source location corresponding to the client device 212 that generated the request notification. The UAV 202 may also obtain facility information corresponding to the area of the request notification to refine the potential source locations. For example, if the facility information includes section, row, and seat information, the UAV can reduce the position of the potential source location down to the rows and seats within the portion of the determined area that includes the source location of the client device 212. In a similar manner, if the request notification is sent to a remote computing resource, rather than or in addition to the UAV 202, the remote computing resource may determine the source location based on the request notification and additional facility information.

Similar to the example discussed above with respect to FIGS. 1A-1C, the UAV and/or remote computing resources may also send a confirmation to the client device 212 and/or request additional information from the client device 212. The additional information may include, for example, a visual beacon that is emitted by the client device, an audible beacon that is emitted by the client device, streaming video that includes representations of the UAV 202, images of the UAV, images of a user of the client device, images of a shadow of the user of the client device, etc. In other examples, the UAV 202 may utilize the image capture device 206 to obtain an image of the area that includes the source location of the client device 212 and send that image to the client device with a request for an action from the user 210. For example, the request may ask that the user indicate their position within the image (e.g., by circling themselves in the image, touching the relevant portion of the image). The position information corresponding to the portion of the image selected by the user may be wirelessly sent back to the UAV and/or the remote computing resource as the additional information. In still another example, the UAV may send a request to the client device 212 that the user 210 perform an action, such as standing up, performing a gesture (e.g., raising one arm, waiving). As the user is performing the action, the UAV may use the image capture device 206 to obtain images of the area and process those images, and/or send those images to remote computing resources for processing, to detect the user 210 performing the action and use the facility information to determine the position of the user (e.g., row and seat number). In some implementations, the additional information may also indicate an item to be delivered to the source location or another action that is to be performed at the source location.

Based on the request notification, the facility information, and/or the additional information, the UAV 202 and/or remote computing resource may determine the source location. Likewise, the UAV sends instructions to cause an action and/or service to be performed at the source location. In some implementations, the action may be to deliver an item (e.g., food) to the source location. As an alternative, the remote computing resource may send instructions to cause the action and/or service to be performed at the source location. The action and/or service may be performed by the UAV and/or another agent located within the controlled environment.

Figure 4:
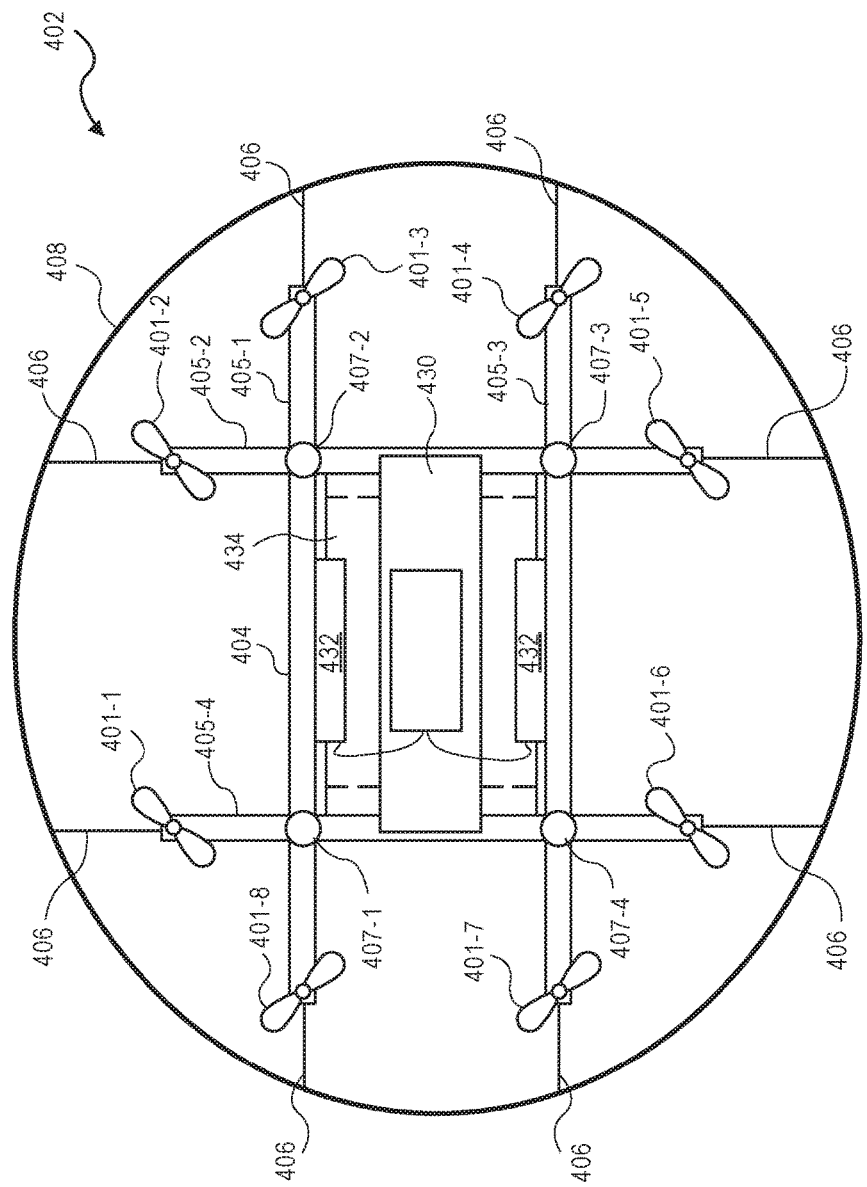
FIG. 4 is a block diagram of an example unmanned aerial vehicle, according to an implementation.

FIG. 4 illustrates a block diagram of a top-down view of a UAV 402, according to an implementation. As illustrated in FIG. 4, the UAV 402 includes eight propellers 401-1, 401-2, 401-3, 401-4, 401-5, 401-6, 401-7, 401-8 powered by propeller motors and spaced about a body 404 of the UAV as part of a propulsion system. As will be described in more detail below with respect to FIG. 7, a control system 430 is utilized for controlling the propeller motors for aerially navigating the UAV 402, as well as controlling other operations of the UAV 402.

The motors and propellers 401 may be of any type and of a size sufficient to lift the UAV 402 and any items engaged by the UAV 402 so that the UAV 402 can navigate through the air. In one implementation, the propellers may be made of one or more suitable materials such as graphite, carbon fiber, etc. While the example of FIG. 4 includes eight motors and propellers, in other implementations, more or fewer motors and/or propellers may be utilized for the propulsion system of the UAV 402. Likewise, in some implementations, the motors and/or propellers may be positioned at different locations on the UAV 402. In addition, alternative methods of propulsion may be utilized. For example, engines, fans, jets, turbojets, turbo fans, jet engines, and the like may be used to propel the UAV.

The body or frame of the UAV 402 may be of any suitable material, such as graphite, carbon fiber, and/or aluminum. In this example, the body of the UAV 402 includes four rigid members 405-1, 405-2, 405-3, 405-4, or beams arranged in a hash pattern with the rigid members intersecting and joined at approximately perpendicular angles at intersection points 407-1, 407-2, 407-3, and 407-4. The propellers 401 and corresponding propeller motors are positioned at both ends of each rigid member 405. In this example, rigid members 405-1 and 405-3 are arranged parallel to one another and are approximately the same length. Rigid members 405-2 and 405-4 are arranged parallel to one another, yet perpendicular to rigid members 405-1 and 405-3. Rigid members 405-2 and 405-4 are approximately the same length. In some implementations, all of the rigid members 405 may be of approximately the same length, while in other implementations, some or all of the rigid members may be of different lengths. Likewise, the spacing between the two sets of rigid members may be approximately the same or different.

While the implementation illustrated in FIG. 4 includes four rigid members 405 that are joined to form at least part of the body, in other implementations, there may be fewer or more components to the body of the UAV 402. For example, rather than four rigid members, in other implementations, the body of the UAV 402 may be configured to include six rigid members. In such an example, two of the rigid members 405-2, 405-4 may be positioned parallel to one another. Rigid members 405-1, 405-3 and two additional rigid members on either side of rigid members 405-1, 405-3 may all be positioned parallel to one another and perpendicular to rigid members 405-2, 405-4. With additional rigid members, additional cavities with rigid members on all four sides may be formed. As discussed further below, a cavity within the body may be configured to include a payload 434 for the transport of item(s) and/or containers that contain item(s) (e.g., for the delivery of an item to a user).

In some implementations, the UAV 402 may be configured for aerodynamics. For example, an aerodynamic housing may be included on the UAV that encloses the UAV control system 430, one or more of the rigid members 405, the body, and/or other components of the UAV 402. The housing may be made of any suitable material(s) such as graphite, carbon fiber, aluminum, etc. Likewise, in some implementations, the payload 434 may be configured to enclose items and to be able to individually dispense items from the payload.

Extending outward from each rigid member is a support arm 406 that is connected to a safety barrier 408. In this example, the safety barrier is positioned around and attached to the UAV 402 in such a manner that the motors and propellers 401 are within the perimeter of the safety barrier 408. The safety barrier may be plastic, rubber, etc. Likewise, depending on the length of the support arms 406 and/or the length, number or positioning of the rigid members 405, the safety barrier may be round, oval, or any other shape.

Mounted to the body 404 is the UAV control system 430. In this example, the UAV control system 430 is mounted in the middle and on top of the body 404. The UAV control system 430, as discussed in further detail below with respect to FIG. 7, controls the navigation, communication, source location determination, and other operations of the UAV 402. In various implementations, the UAV 402 may also include one or more power modules 432. In this example, the UAV 402 includes two power modules 432 that are removably mounted to the body 404. In various implementations, the power module(s) for the UAV may be in the form of battery power, solar power, gas power, super capacitor, fuel cell, alternative power generation source, or a combination thereof. The power modules 432 are coupled to and provide power for the UAV control system 430, the propeller motors, the image capture device, etc.

As noted above, the UAV may also include an image capture device and or a projection component. The image capture device may be any type of image capture device, such as digital red-green-blue (RGB) camera, a RGB depth (RGBD) camera, an ultrasonic camera, a thermal camera, etc. The projection component may by any type of display or projector that can visually present information to individuals or users.

While the implementations of the UAV discussed herein utilize propellers to achieve and maintain flight, in other implementations, the UAV may be configured in other manners. For example, the UAV may include fixed wings and/or a combination of both propellers and fixed wings. In such configurations, the UAV may utilize one or more propellers to enable takeoff and landing and a fixed wing configuration or a combination wing and propeller configuration to sustain flight while the UAV is airborne.

Figure 5:
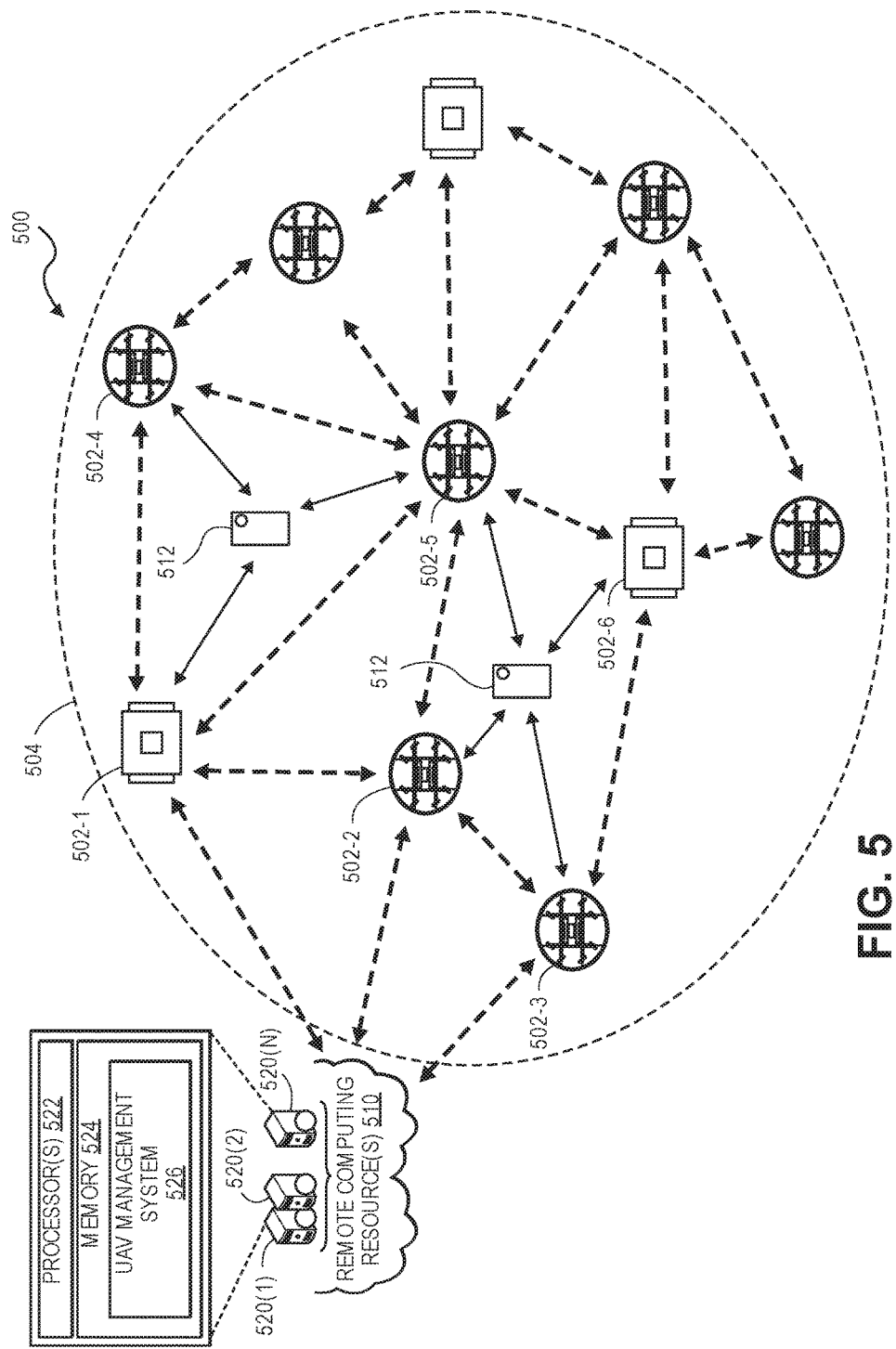
FIG. 5 depicts a block diagram of an unmanned aerial vehicle environment, according to an implementation.

FIG. 5 depicts a block diagram of a UAV environment 500 that includes UAVs 502, and remote computing resources 510, according to an implementation. The UAV environment 500 may be a controlled environment or an uncontrolled environment. As discussed above, the environment may include one or many UAVs. Each of the UAVs 502 and/or remote computing resources 510 may be configured to communicate with one another. For example, the UAVs 502 may be configured to form a wireless mesh network that utilizes Wi-Fi or another wireless means of communication, each UAV communicating with other UAVs within wireless range. In other implementations, the UAVs 502, and/or UAV management system 526 may utilize existing wireless networks (e.g., cellular, Wi-Fi, satellite) to facilitate communication.

The remote computing resources 510 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 510 may include one or more servers, such as servers 520(1), 520(2) . . . 520(N). These servers 520(1)-(N) may be arranged in any number of ways, such as server farms, stacks, and the like that are commonly used in data centers. Furthermore, the servers 520(1)-(N) may include one or more processors 522 and memory 524 that may store a UAV management system 526.

The UAV management system 526 may be configured, for example, to communicate with the UAVs 502, materials handling facilities and/or other facilities.

When a message, such as a request notification and/or additional information is sent to or from a UAV, the message may include an identifier for the UAV, and each UAV may act as a node within the network, forwarding the message until it is received by the intended UAV. For example, a client device 512 may send a message, such as a request notification, to UAV 502-6 by transmitting the message and the identifier of the intended receiving UAV to one or more of UAVs 502-1, 502-2, 502-3, 502-4 that are in wireless communication with the client device 512. Each receiving UAV will process the identifier to determine if it is the intended recipient and then forward the message to one or more other UAVs that are in communication with the UAV. For example, UAV 502-2 may forward the message and the identification of the intended receiving UAV to UAV 502-1, 502-3 and 502-5. In such an example, because UAV 502-3 has already received and forwarded the message, it may discard the message without forwarding it again, thereby reducing load on the wireless mesh network 504. The other UAVs, upon receiving the message, may determine that they are not the intended recipient and forward it on to other nodes. This process may continue until the message reaches the intended recipient.

The wireless mesh network 504 may be used to provide communication between UAVs (e.g., to share weather information, environment information, location information, facility information, routing information), the UAV management system 526, materials handling facilities, and/or client devices 512. In general, the wireless mesh network 504 may be used as a wireless network providing service to client devices 512 so that those client devices 512 can communicate with the UAVs 502 and/or other devices.

As illustrated in FIG. 5, different types of UAVs may be utilized together to provide coverage. For example, some of the UAVs, such as UAV 502-2, 502-3, may be aerial UAVs and some of the UAVs, such as UAVs 502-1, 502-6 may be ground based UAVs.

Figure 6:
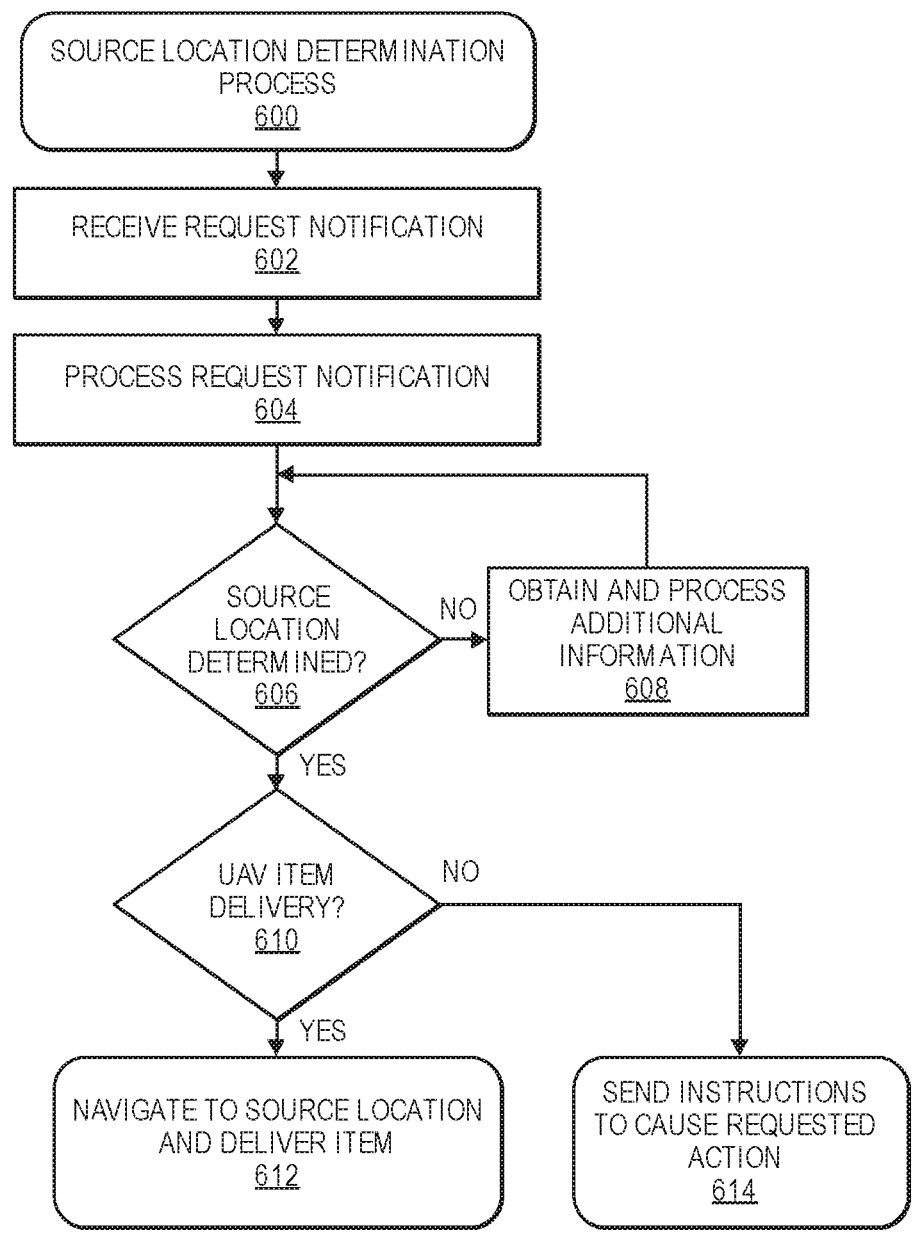
FIG. 6 is a flow diagram illustrating an example source location determination process, according to an implementation.

FIG. 6 is a flow diagram illustrating an example source location determination process 600, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins upon receiving at a UAV a request notification from a client device, as in 602. The request notification may be sent to the UAV via any form of wireless communication. For example, a wireless communication channel, such as a point-to-point connection, Wi-Fi connection, cellular connection, etc., may be established between the client device and the UAV and the request notification may be sent from the client device to the UAV via the wireless communication channel. In some implementations, the UAV may provide a Wi-Fi connection, or "hot spot," to which a client device can wirelessly connect. In other implementations, a point-to-point wireless communication may be established between the client device and the UAV. In still another example, the UAV may present a code that can be entered into the client device to send a request notification to the UAV. For example, the code may result in a text message, short-message, multimedia-message, etc. being sent from the client device to the UAV.

The request notification may include, for example, information regarding the client device (e.g., position information), an image obtained by the client device that includes a representation of the UAV, etc.

In other implementations, the request notification may be emitted by the client device in the form of a visual output, such as a beacon, and/or an audible output, that is detected by the UAV. For example, the client device may emit a visual signal using an illumination element on the client device. The visual signal may be a pattern that is recognizable by the UAV as a request notification. In some implementations, the visual signal may be sent using different light spectrums (e.g., visible light spectrum, infrared light spectrum, ultraviolet light spectrum). In such implementations, the UAV includes an image capture device that is capable of detecting the request notification in the transmitted light spectrum.

Upon detecting the request notification, the request notification is processed to determine the source location, or determine an area that includes the source location, as in 604. For example, if the request notification includes an image of the UAV, the UAV may process the image to determine an area that includes the source location of the client device. For example, the image may be processed using one or more algorithms, such as an object detection algorithm, edge detection algorithm, and/or grey scale processing algorithm, to detect the position of the UAV represented in the image and/or to detect other objects represented in the image. Other objects may include, for example, clouds, buildings, trees, landscapes, other UAVs, celestial objects (e.g., sun, moon, and stars), etc.

In some implementations, the image may be processed to determine unique identifiers represented on the UAV. As discussed above, the UAV may include different unique identifiers on different sides of the UAV and, based on the unique identifiers represented in the image, the UAV can determine an approximate perspective of the client device, which may be used to determine the area that includes the source location of the client device. Likewise, as discussed above with respect to FIG. 3, the UAV may utilize an image capture device on the UAV to scan the environment to detect other objects represented in the image and determine an alignment of the client device by aligning the image capture device such that the objects represented in the received image are correlated with the objects as viewed in the image capture device. Based on the known position of the UAV, the focal length of the image capture device on the UAV, and/or the focal length corresponding to the received image, the distance between the client device, the objects, and/or the UAV can be determined. Utilizing the determined distances and the determined perspective of the client device, the source location, or an area that includes the source location is determined.

If the request notification is a light pattern or an audible pattern, the source location may be determined directly from the client device. For example, if the light pattern is repeated, the UAV, upon detecting the request notification may continue to monitor the source of the request notification and be able to determine the source location as the pattern is repeated.

Returning to FIG. 6, a determination is made as to whether the source location is determined, as in 606. In some implementations, source location determination may vary depending on the information provided by the client device, the determined perspective of the client device, whether other objects are in the area that includes the source location, etc. For example, if the example process 600 determines an area, such as a five foot radius and is confident that the source location is within the area, it may be determined that the source location is known if there are no other objects in the determined area. However, if there are multiple objects (e.g., humans) within the area, it is determined that the source location is not known and that additional information is needed.

If it is determined that the source location has not been determined, additional information is obtained and processed by the UAV in an effort to determine the source location, as in 608. The additional information may be obtained from the client device, from the UAV, and/or from a remote source. For example, the UAV may send a request to the client device to provide additional information. For example, the UAV may obtain an image of the area that includes the source location, send the obtained image to the client device, and request that a user of the client device indicate the source location on the obtained image. For example, the request may ask that a user of the client device circle the portion of the image that includes the representation of the user, or touch a position on the image that includes a representation of the user, etc. Upon receiving input from the user, the client device sends the position information corresponding to the input back to the UAV as additional information.

In another example, the UAV may send a request for additional information back to the client device that includes a request that the user and/or the client device perform an action that can be detected by the UAV. For example, the request may ask that the user perform a gesture (e.g., wave, raise hand, and stand up). Alternatively, or in addition thereto, the request may cause the client device to generate a visible and/or audible output (e.g., beacon) that can be detected by the UAV. In still another example, the UAV may project an image onto a surface near the area of the source location and send a request to the client device that is presented to the user requesting that the user position themselves on the projected image.

In another example, if the environment is a controlled environment, the UAV may obtain, or have stored in memory, facility information (e.g., section, row, seat information) corresponding to the facility that includes the controlled environment. Such information may be used in conjunction with the determined area that includes the source location of the client device to determine the source location of the client device. For example, if the facility is a stadium with sections and rows of seats, the determined area that includes the source location may be used to determine the section, rows, and seats within the area. Such information may be further processed to determine additional information about users located in those seats.

Likewise, in some implementations, the request notification received by the UAV may include a user identification. Based on the user identification and the user information known about users located in the seats, the source location of the client device can be confirmed. For example, if the facility information maintains information that User A is assigned to section 300, row G, seat 21, the request notification includes a user identifier corresponding to User A, and the area determined to include the source location of the client device includes section 300, row G, seat 21, it can be confirmed that source location of the client device is section 300, row G, seat 21. In comparison, if the user identifier, facility information, etc. does not match, the source location is not determined and still more additional information may be obtained.

Upon obtaining and processing additional information, at block 608, the example process returns to decision block 606 and continues. If it is determined at decision block 606 that the source location has been determined, it is determined whether the action to be performed at the source location of the client device is delivery of an item by the UAV, as in 610. As discussed above, in some implementations, the UAV may include a payload that is configured to dispense items at a source location in response to a request notification. If it is determined that the action to be performed is an item delivery by the UAV, the UAV navigates to a position above the source location of the client device and dispenses the requested item, as in 612. For example, the item may be dispensed from the payload of the UAV and allowed to fall under the forces of gravity to the source location, the item may be lowered to the source location from the UAV using, for example a cable system that extends and retracts all or a portion of the payload, the item may be dispensed from the payload and the descent controlled by a parachute or other configuration designed to slow the descent of the item, etc.

If it is determined that the action to be performed at the source location of the client device is not an item delivery by the UAV, the UAV sends instructions to another entity to cause the requested action or service to be performed, as in 614. In some implementations, the UAV may navigate to a position above the source location to provide an indication to the other entity (e.g., an agent) as to the source location. Alternatively, or in addition thereto, the UAV may send source location information, such as section, row, and seat number corresponding to the source location of the client device, in instances where the environment is a controlled environment.

Figure 7:
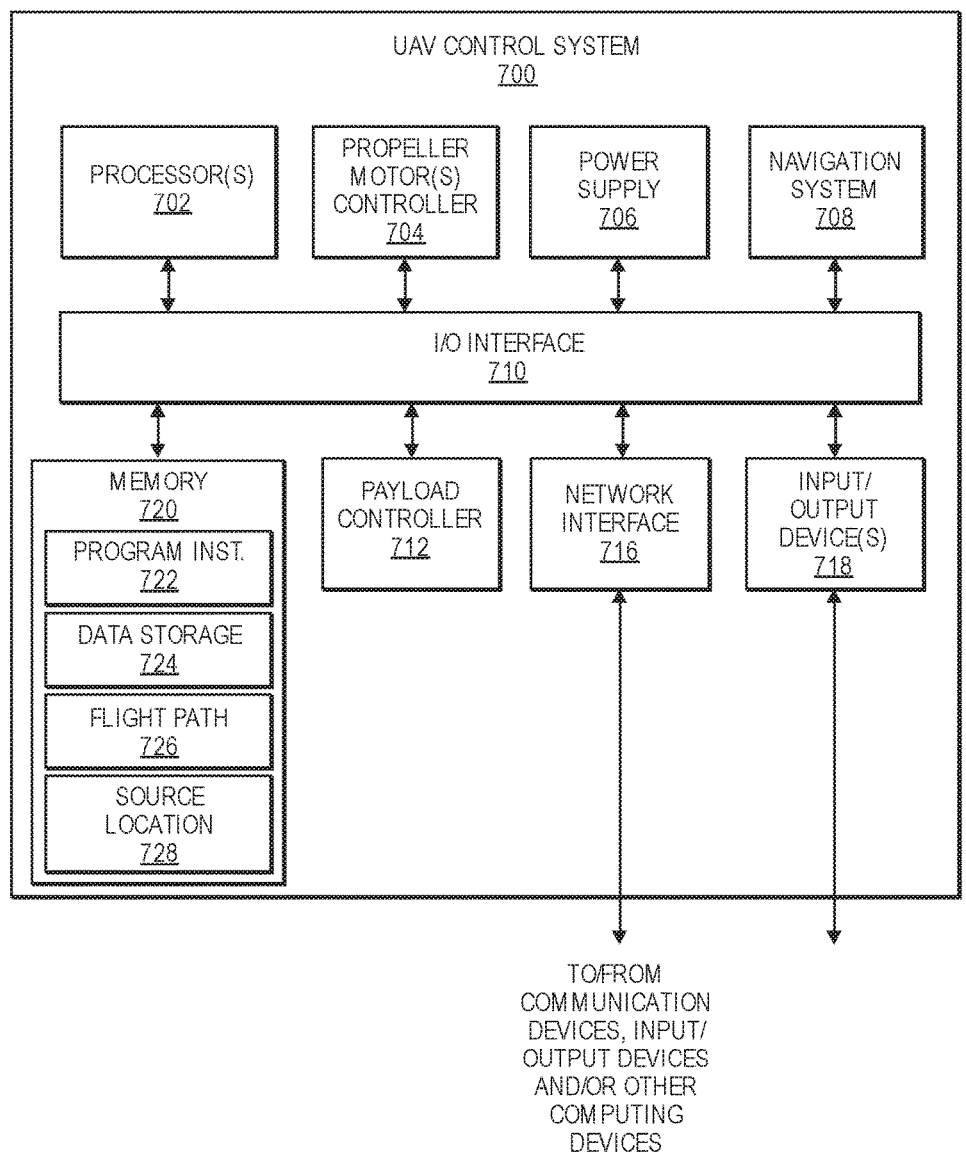
FIG. 7 is a block diagram illustrating various components of an unmanned aerial vehicle control system, according to an implementation.

FIG. 7 is a block diagram illustrating an example UAV control system 700 of a UAV 100. In various examples, the block diagram may be illustrative of one or more aspects of the UAV control system 700 that may be used to implement the various systems and methods discussed above. In the illustrated implementation, the UAV control system 700 includes one or more processors 702, coupled to a non-transitory computer readable storage medium 720 via an input/output (I/O) interface 710. The UAV control system 700 may also include a propeller motor controller 704, power supply module 706, and/or a navigation system 708. The UAV control system 700 further includes a payload controller 712, a network interface 716, such as a wireless communication interface, and one or more input/output devices 718.

In various implementations, the UAV control system 700 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724, flight path data 726 and a source location determining programming 728, respectively. In other implementations, program instructions, flight path data, source location determining and/or other data may be received, sent, or stored upon different types of computer-accessible media, such as non-transitory media, or on similar media separate from the non-transitory computer readable storage medium 720 or the UAV control system 700. Generally speaking, a non-transitory, computer readable storage medium may include storage media or memory media such as magnetic or optical media coupled to the UAV control system 700 via the I/O interface 710. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The propeller motor(s) controller 704 communicates with the navigation system 708 and adjusts the power of each propeller motor to fly the UAV along a determined flight path. The navigation system 708 may include a GPS or other similar system that can be used to navigate the UAV to and/or from different positions within an environment. The power supply module 706 may control the charging and any switching functions associated with one or more power modules (e.g., batteries) of the UAV.

The payload controller 712 controls the dispensing of items from a payload when the UAV is positioned over a source location. The network interface 716 may be configured to allow data to be exchanged between the UAV control system 700 and other devices attached to a network, such as other computer systems (e.g., client devices). In various implementations, the network interface 716 may support communication via wireless general data networks, such as a Wi-Fi network. For example, the network interface 716 may support communication via telecommunications networks such as cellular communication networks, satellite networks, and the like. In other implementations, as discussed above, the network interface 716 may be configured to support establishment of a mesh network among multiple vehicles and/or establish a point-to-point wireless connection between the UAV and another component, such as a client device.

Input/output devices 718 may, in some implementations, include one or more displays, image capture devices, thermal sensors, infrared sensors, time of flight sensors, accelerometers, pressure sensors, airflow sensors, speed sensors, vibration sensors, noise sensors, weight sensors, temperature sensors, etc. Multiple such input/output devices 718 may be present and controlled by the UAV control system 700. Certain sensors may also be utilized to assist with navigation, landings, avoiding obstacles during flight, determining source locations, processing images, etc.

As shown in FIG. 7, the memory may include program instructions 722 that may be configured to implement the example processes and/or sub-processes described above. The data storage 724 may include various data stores for maintaining data items that may be provided for determining flight paths, landing, determining source locations, etc.

Those skilled in the art will appreciate that the UAV control system 700 is merely illustrative and is not intended to limit the scope of the present disclosure. In particular, the computing system and devices may include any combination of hardware or software that can perform the indicated functions, including computers, network devices, internet appliances, wireless phones, etc. The UAV control system 700 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 700. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 700 may be transmitted to the UAV control system 700 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method to determine a source location, the method comprising:
    establishing a wireless connection between an unmanned aerial vehicle ("UAV") positioned at a UAV position within an uncontrolled environment and a client device positioned at a source location within the uncontrolled environment;
    receiving at the UAV via the wireless connection, an image that includes a representation of the UAV at the UAV position, wherein the image is obtained by the client device at the source location;
    processing, with the UAV, the image to determine an area within the uncontrolled environment including the source location;
    aerially navigating the UAV toward the area;
    processing at the UAV additional information to determine the source location within the area; and
    delivering with the UAV a payload to the source location.

2. The method of claim 1, wherein processing with the UAV the image to determine the area, includes:
    determining a first position of the UAV represented in the image;
    determining a second position of an object represented in the image, wherein the object is not the UAV;
    scanning with a camera coupled to the UAV, a second area of the uncontrolled environment to detect the object within the uncontrolled environment;
    determining a perspective of the client device based at least in part on the first position of the UAV and the second position of the object; and
    determining the area based at least in part on the perspective.

3. The method of claim 2, wherein the object is at least one of a building, a cloud, a second UAV, an aerial vehicle, a landscape, a landmark, or a celestial object.

4. The method of claim 1, further comprising:
    sending from the UAV via the wireless connection a request to the client device, requesting that the client device provide to the UAV the additional information, wherein the additional information includes at least one of:
        the client device emitting a visual beacon,
        the client device emitting an audible beacon,
        the client device presenting information on a display requesting action from a user,
        the client device sending via the wireless connection streaming video obtained by the client device that includes a representation of the UAV,
        the client device sending via the wireless connection additional images of the UAV obtained by the client device, or
        the client device sending via the wireless connection an image of a user of the client device, or the client device sending via the wireless connection an image of a shadow of the user of the client device.

5. The method of claim 1, further comprising:
obtaining with a camera positioned on the UAV, a second image of the area containing the source location;
sending from the UAV via the wireless connection to the client device, the second image;
receiving at the UAV and from the client device via the wireless connection, an indication of the source location represented in the second image, wherein the indication of the source location is included in the additional information; and
wherein processing the additional information includes, determining from the indication the source location within the area.

6. A method to determine a source location, comprising:
detecting a request notification that is generated by a client device at the source location;
receiving, at an unmanned aerial vehicle ("UAV") at a UAV position within an environment that includes the source location, an image of the UAV that includes a representation of the UAV at the UAV position;
determining, based at least in part on the image, position information corresponding to the source location; and
sending instructions to a remote source to perform an action at the source location.

7. The method of claim 6, wherein the position information includes a row and a seat identification.

8. The method of claim 6, wherein the source location is within a controlled environment.

9. The method of claim 6, wherein detecting the request notification includes:
receiving a wireless transmission from the client device.

10. A non-transitory computer readable storage medium storing instructions that when executed by one or more processors cause the one or more processors to perform acts comprising:
receive, at an unmanned aerial vehicle ("UAV") at a UAV position within an environment that includes a source location, an image of the UAV that includes a representation of the UAV at the UAV position;
determine, based at least in part on the image, position information corresponding to the source location; and
cause instructions to be sent to perform an action at the source location.

11. The non-transitory computer readable storage medium of claim 10, wherein the instructions when executed by the one or more processors further cause the one or more processors to perform acts comprising:
detect a request notification generated by a client device positioned at the source location.

12. The non-transitory computer readable storage medium of claim 11, wherein the request notification is detected based on a wireless transmission from the client device being received.

13. The non-transitory computer readable storage medium of claim 10, wherein the instructions are sent to a remote source.

14. The non-transitory computer readable storage medium of claim 10, wherein the position information includes a row and a seat identification.

15. The non-transitory computer readable storage medium of claim 10, wherein the action includes at least one of the UAV or a second UAV navigating to a position proximate the source location and dispensing an item.

16. The non-transitory computer readable storage medium of claim 10, wherein the instructions that when executed by the one or more processors further cause the one or more processors to perform the acts comprising:
receive a beacon emitted by a client device positioned at the source location.

17. The non-transitory computer readable storage medium of claim 10, wherein the action includes an agent delivering an item to the source location.

* * * * *